United States Patent
Gowda et al.

(10) Patent No.: US 10,771,192 B2
(45) Date of Patent: Sep. 8, 2020

(54) POWER SAVING IN NARROWBAND DEVICES BY EARLY TERMINATION OF DECODING OF COMMUNICATION CHANNELS

(71) Applicant: QUALCOMM Incorporated, San Diego, CA (US)

(72) Inventors: Raghu Hanumantha Gowda, Bengaluru (IN); Gowrisankar Somichetty, Bangalore (IN); Mangesh Shete, Hyderabad (IN); Swarupa Gandhi Vudata, Hyderabad (IN); Siva Kishore Reddy Yerrapareddy, Kadapa (IN); Karthik Pavan Krishna Bhogaraju, Hyderabad (IN); Sathish Machukari, Adilabad (IN); Nilotpal Dhar, Hyderabad (IN); Chun-Hao Hsu, San Jose, CA (US); Avinash Manda, Hyderabad (IN); Shashidhar Vummintala, Bangalore (IN); Vivek Padi, Bangalore (IN); Bishal Maskey, Hyderabad (IN); Vishu Kumar, Koppa (IN); Bharath Sakinala, Hyderabad (IN); Venugopal Ramamurthy, Hyderabad (IN); Vijayvaradharaj Tirucherai Muralidharan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/045,589

(22) Filed: Jul. 25, 2018

(65) Prior Publication Data

US 2019/0036647 A1    Jan. 31, 2019

(30) Foreign Application Priority Data

Jul. 31, 2017  (IN) .............................. 201741027115

(51) Int. Cl.
*H04L 1/00* (2006.01)
*H04W 52/02* (2009.01)
(Continued)

(52) U.S. Cl.
CPC .......... *H04L 1/0051* (2013.01); *H04L 1/0053* (2013.01); *H04L 1/08* (2013.01);
(Continued)

(58) Field of Classification Search
None
See application file for complete search history.

(56) References Cited

U.S. PATENT DOCUMENTS

2013/0244666 A1   9/2013  Carmon et al.
2013/0322422 A1   12/2013 Chung et al.
(Continued)

*Primary Examiner* — Ruihua Zhang
(74) *Attorney, Agent, or Firm* — Patterson & Sheridan, L.L.P.

(57) ABSTRACT

Techniques and apparatus for early termination of decoding of communication channels for power saving in narrowband devices are provided. One technique includes monitoring for one or more first repetitions of at least one communication channel from a base station. The device determines, based on the monitoring, whether to refrain from monitoring for one or more second repetitions of the at least one communication channel. The device enters a low power mode if the determination is to refrain from monitoring for the one or more second repetitions of the at least one communication channel.

30 Claims, 15 Drawing Sheets

(51) Int. Cl.
*H04W 72/04* (2009.01)
*H04W 4/70* (2018.01)
*H04L 1/08* (2006.01)

(52) U.S. Cl.
CPC ... *H04W 52/0216* (2013.01); *H04W 52/0219* (2013.01); *H04W 52/0229* (2013.01); *H04W 52/0232* (2013.01); *H04W 72/0406* (2013.01); *H04W 72/0446* (2013.01); *H04W 4/70* (2018.02)

(56) References Cited

U.S. PATENT DOCUMENTS

| | | |
|---|---|---|
| 2017/0034850 A1 | 2/2017 | Rico et al. |
| 2017/0257190 A1 | 9/2017 | Wang et al. |
| 2017/0303248 A1 | 10/2017 | Chatterjee et al. |
| 2018/0227880 A1* | 8/2018 | Su ..................... H04W 68/02 |

* cited by examiner

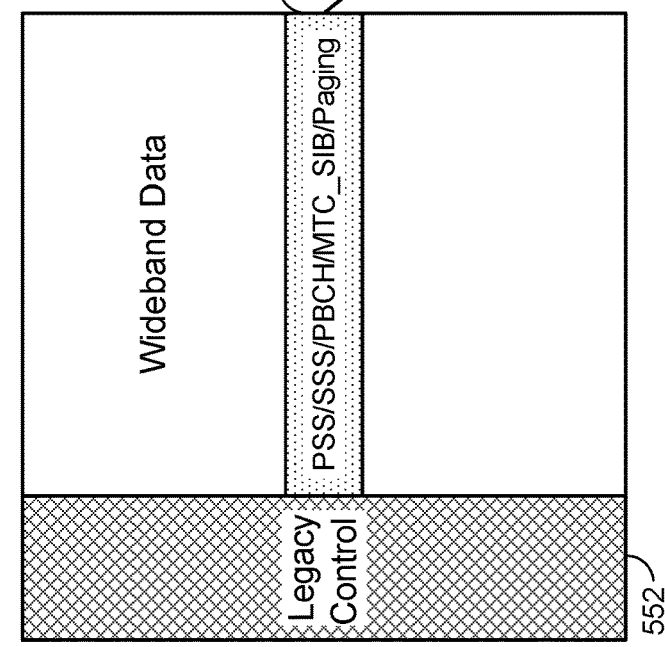
FIG. 5A
FIG. 5B

PDCCH repetition hypothesis for Rmax = 8

POWER SAVING IN NARROWBAND DEVICES BY EARLY TERMINATION OF DECODING OF COMMUNICATION CHANNELS

CROSS-REFERENCE TO RELATED APPLICATION

This application claims the benefit of and priority to Indian Provisional Patent Application Serial No. 201741027115, filed Jul. 31, 2017, which is assigned to the assignee hereof and hereby expressly incorporated by reference herein.

BACKGROUND

I. Field of the Disclosure

Certain aspects of the present disclosure generally relate to wireless communications, and more specifically to improved techniques for saving power in certain devices (e.g., narrowband devices such as CAT-M devices, CAT-NB-IoT devices, etc.) by early terminating the decoding of communication channels (e.g., machine type communication (MTC) physical downlink control channel (PDCCH) (MPDCCH), narrowband PDCCH (NPDCCH), MTC physical downlink shared channel (MPDSCH), NPDSCH, system information block (SIB), etc.).

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method for wireless communications performed by an apparatus (e.g., user equipment (UE)). The method generally includes monitoring for one or more first repetitions of at least one communication channel from a base station. The method also includes determining, based on the monitoring, whether to refrain from monitoring for one or more second repetitions of the at least one communication channel. The method further includes entering a low power mode if the determination is to refrain from monitoring for the one or more second repetitions of the at least one communication channel.

Certain aspects of the present disclosure provide an apparatus for wireless communications. The apparatus generally includes at least one processor and a memory coupled to the at least one processor. The at least one processor is configured to monitor for one or more first repetitions of at least one communication channel from a base station. The at least one processor is also configured to determine, based on the monitoring, whether to refrain from monitoring for one or more second repetitions of the at least one communication channel. The at least one processor is further configured to enter a low power mode if the determination is to refrain from monitoring for the one or more second repetitions of the at least one communication channel.

Certain aspects of the present disclosure provide an apparatus for wireless communications. The apparatus generally includes means for monitoring for one or more first repetitions of at least one communication channel from a base station. The apparatus also includes means for determining, based on the monitoring, whether to refrain from monitoring for one or more second repetitions of the at least one communication channel. The apparatus further includes means for entering a low power mode if the determination is to refrain from monitoring for the one or more second repetitions of the at least one communication channel.

Certain aspects of the present disclosure provide a computer-readable medium having computer executable code stored thereon for wireless communication by an apparatus. The computer executable code generally includes code for monitoring for one or more first repetitions of at least one communication channel from a base station. The computer executable code also includes code for determining, based on the monitoring, whether to refrain from monitoring for one or more second repetitions of the at least one communication channel. The computer executable code further includes code for entering a low power mode if the determination is to refrain from monitoring for the one or more second repetitions of the at least one communication channel.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A and 5B illustrate an example of MTC coexistence within a wideband system, such as LTE, in accordance with certain aspects of the present disclosure.

DETAILED DESCRIPTION

Figure 1:
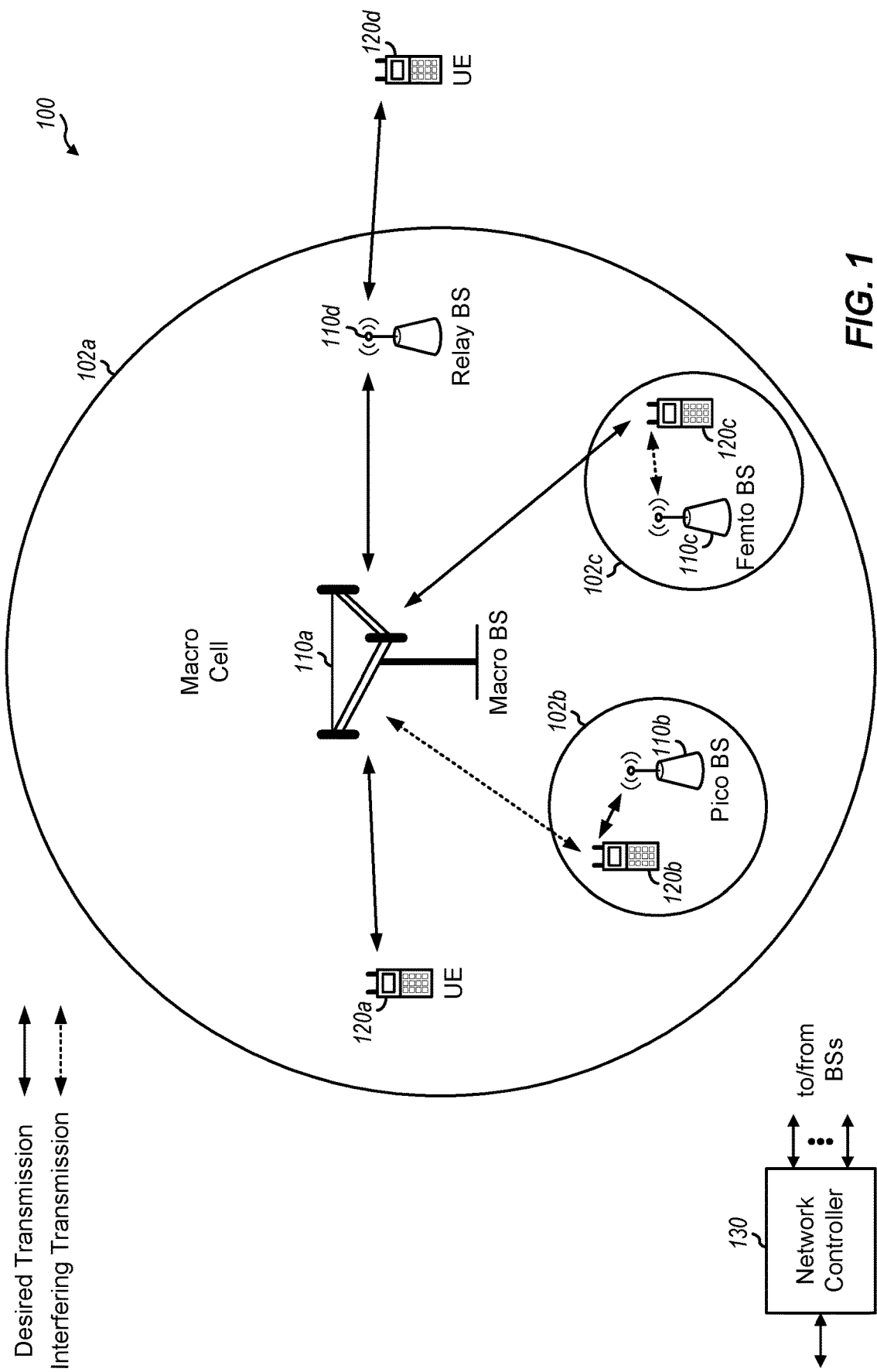
FIG. 1 is a block diagram conceptually illustrating an example wireless communication network, in accordance with certain aspects of the present disclosure.

Aspects of the present disclosure discuss techniques for saving power in devices with limited communications resources, for example, narrowband devices such as MTC devices, enhanced MTC (eMTC) devices, narrowband Internet of Things (NB-IoT) devices, etc.

Some systems (e.g., eMTC, NB-IoT, etc.) may employ devices (e.g., eMTC/NB-IoT UEs) with limited communication resources (e.g., compared to legacy and/or advanced LTE devices) for applications where a small amount of data is transmitted infrequently. Examples of such applications can include meters for reading water levels, gas consumption, electricity use, etc. These devices may generally be expected to operate in remote areas (e.g., have capability to transmit and/or receive in remote/low coverage areas) and/or operate for substantially long periods of time (e.g., in some cases may be expected to last as long as 10 years or more).

To achieve coverage enhancement for eMTC/NB-IoT UEs, systems may employ bundling, in which multiple repetitions of a same message are transmitted over one or more subframes. In current systems, however, bundling can increase the amount of time that these devices have to be awake (e.g., in an active power state). This can increase the UE's power consumption and reduce the amount of time the UE is able to operate (e.g., in remote areas). Accordingly, it may be desirable to provide techniques that enable eMTC/NB-IoT devices to reduce power consumption during operation.

Aspects presented herein provide techniques that can significantly reduce a device's power consumption when receiving multiple repetitions of a channel (e.g., a communication channel such as control channel, data channel, shared channel, random access channel, broadcast channel, etc.) by enabling the device to terminate decoding of the repetitions when the device determines certain conditions are met. Depending on context, a channel refers to the channel itself or signal(s)/message(s) carried on the channel. As presented herein, in some cases, the device may skip further decoding of a downlink channel (e.g., in subsequent subframes) if the device has already detected or decoded the channel (e.g., in previous subframes). In some cases, the device may skip further decoding of the downlink channel (e.g., in subsequent subframes) if the device has detected one or more decoding failures (e.g., in previous subframes) and determines that radio conditions satisfy a predetermined condition (e.g., are at or above a threshold quality level). In some cases, the device may skip further decoding of the downlink channel if the device determines radio conditions satisfy a predetermined condition (e.g., are below a threshold quality level).

If the device determines to terminate the decoding of the repetitions, the device can enter a low power mode for a duration of the remaining repetitions of the communication channel. Doing so enables devices (e.g., eMTC/NB-IoT devices) to significantly reduce power consumption (and therefore save power) compared to traditional techniques, where such devices generally remain in an active power state for the entire duration of the repetitions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 with base stations (BSs) and user equipments (UEs), in which aspects of the present disclosure may be practiced. In aspects, as opposed to a UE remaining in an active power state for the entire duration of repetitions of a downlink channel (e.g., MPDCCH/NPDCCH, MPDSCH/NPDSCH, SIB, etc.), techniques presented herein can enable a UE to early terminate the decoding of one or more repetitions of the downlink channel when the UE determines certain conditions are met. Such conditions may include one or more of early detection of the downlink channel, determining radio conditions satisfy a predetermined condition, determining that an estimated number of repetitions for successfully decoding the downlink channel has passed, etc. Doing so in this manner enables the UE to significantly save power consumption when receiving multiple repetitions of a channel (associated with operating in a coverage enhancement mode).

The wireless communication network 100 may be an LTE network or some other wireless network, such as a NR or 5G network, and/or may support NB-IoT, MTC, eMTC, etc. Wireless communication network 100 may include a number of base stations (BSs)/evolved Node Bs (eNBs) 110 and other network entities. A base station is an entity that communicates with user equipments (UEs) and may also be referred to as a Node B, an eNB, a NR BS, a gNB, a 5G NB, an access point (AP), a Transmit Receive Point (TRP), a cell, etc. The terms "eNB", "base station", "NR BS", "gNB", "TRP", "AP", "node B", "5G NB", and "cell" may be used interchangeably herein. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Some examples of UEs may include cellular phones, smart phones, personal digital assistants (PDAs), wireless modems, a wireless communication device, handheld devices, navigation devices, gaming devices, cameras, tablets, laptop computers, netbooks, smartbooks, ultrabooks, cordless phones, wireless local loop (WLL) stations, wearable devices (e.g., smart glasses, smart/virtual reality goggles, smart watches, smart wristbands, smart bracelets, smart rings, smart jewelry, smart hats, smart clothing), healthcare/medical devices, vehicular devices, etc. Some UEs may be considered Internet-of-things (IoT) UEs, which may include remote devices, such as sensors, meters, monitors, location tags, drones, trackers, robots, etc., that may communicate with a base station, another remote device, or some other entity. IoT devices, as well as other types of devices, may include MTC/eMTC devices, NB-IoT devices, etc., and techniques disclosed herein may be applied to IoT devices such as MTC/eMTC devices, NB-IoT devices, as well as other devices.

In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and eNB.

One or more UEs 120 in the wireless communication network 100 (e.g., an LTE network) may also be a narrowband bandwidth UE. These UEs (e.g., MTC UEs, eMTC UEs, NB-IoT UEs, etc.) may be low cost, low data rate devices that co-exist with legacy and/or advanced UEs (e.g., capable of operating on a wider bandwidth) in the LTE network and may have one or more capabilities that are limited when compared to the other UEs in the wireless network. For example, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms). To enhance coverage of certain devices, such as narrowband devices, "bundling" may be utilized in which certain transmissions are sent as a bundle of transmissions, for example, with the same information transmitted over multiple subframes.

In some cases, the narrowband UEs (e.g., in LTE Rel-12 and beyond, e.g., 5G releases) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 20 dB.

As used herein, devices with limited communication resources (e.g., smaller bandwidth), such as MTC devices, eMTC devices, NB-IoT devices, etc., may be referred to generally as narrowband UEs. Similarly, legacy devices, such as legacy and/or advanced UEs (e.g., in LTE) are referred to generally as wideband UEs. Generally, wideband UEs are capable of operating on a larger amount of bandwidth than narrowband UEs.

While aspects of the examples described herein may be associated with LTE technologies, aspects of the present disclosure may be applicable with other wireless communications systems, such as NR. NR may support various wireless communication services, such as millimeter wave (mmW) targeting high carrier frequency (e.g., 60 GHz), massive multiple input multiple output (MIMO), sub-6 GHz systems, etc. In some cases, NR may include Enhanced Mobile Broadband (eMBB) service targeting wide bandwidth (e.g. 80 MHz beyond), massive MTC (mMTC) targeting non-backward compatible MTC techniques, mission critical targeting ultra reliable low latency communications (URLLC) service, etc.

NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 8 and 9. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
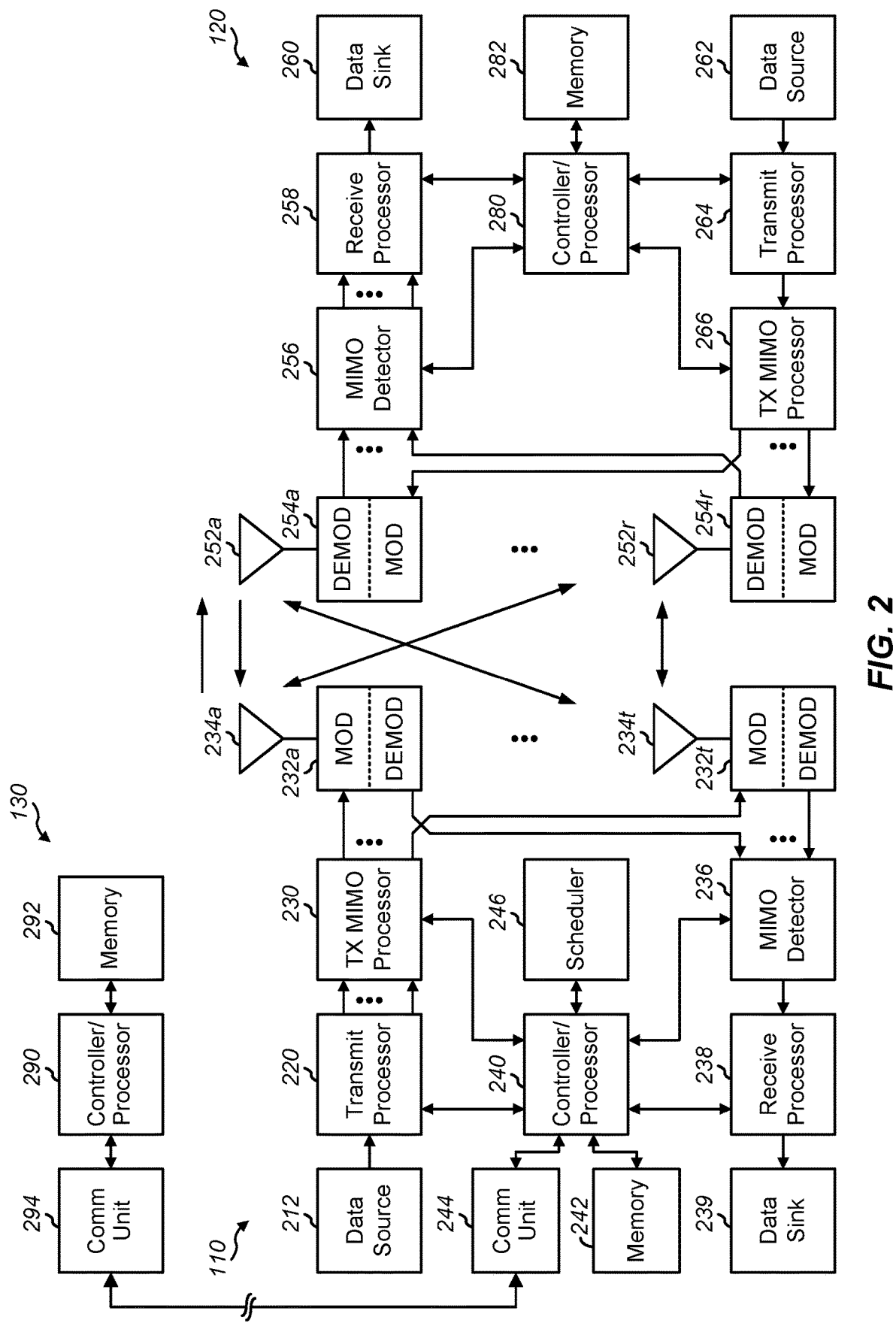
FIG. 2 is a block diagram conceptually illustrating an example of a base station (BS) in communication with a user equipment (UE) in a wireless communications network, in accordance with certain aspects of the present disclosure.

FIG. 2 is a block diagram of a design of BS/eNB 110 and UE 120, which may be one of the eNBs 110 and one of the UEs 120, respectively, in FIG. 1. eNB 110 may be equipped with T antennas 234a through 234t, and UE 120 may be equipped with R antennas 252a through 252r, where in general T≥1 and R≥1.

At eNB 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNB 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to eNB 110. At eNB 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. eNB 110 may include communication unit 244 and communicate to network controller 130 via communication unit 244. Network controller 130 may include communication unit 294, controller/processor 290, and memory 292.

Controllers/processors 240 and 280 may direct the operation at eNB 110 and UE 120, respectively. For example, controller/processor 240 and/or other processors and modules at eNB 110 may perform or direct operations and/or processes for techniques described herein. Similarly, controller/processor 280 and/or other processors and modules at UE 120 may perform or direct operations by the UE in FIGS. 10-16, and/or processes for the techniques described herein. By enabling controller/processor 280 and/or other modules at the UE 120 to perform operations in FIGS. 10-16 (e.g., for early terminating the decoding of repetition(s) of a communication channel), the controller/processor 280 can significantly reduce the amount of power consumed by the UE (and thus save power) when operating in a coverage enhancement mode. Memories 242 and 282 may store data and program codes for eNB 110 and UE 120, respectively. A scheduler 246 may schedule UEs for data transmission on the downlink and/or uplink.

Figure 3:
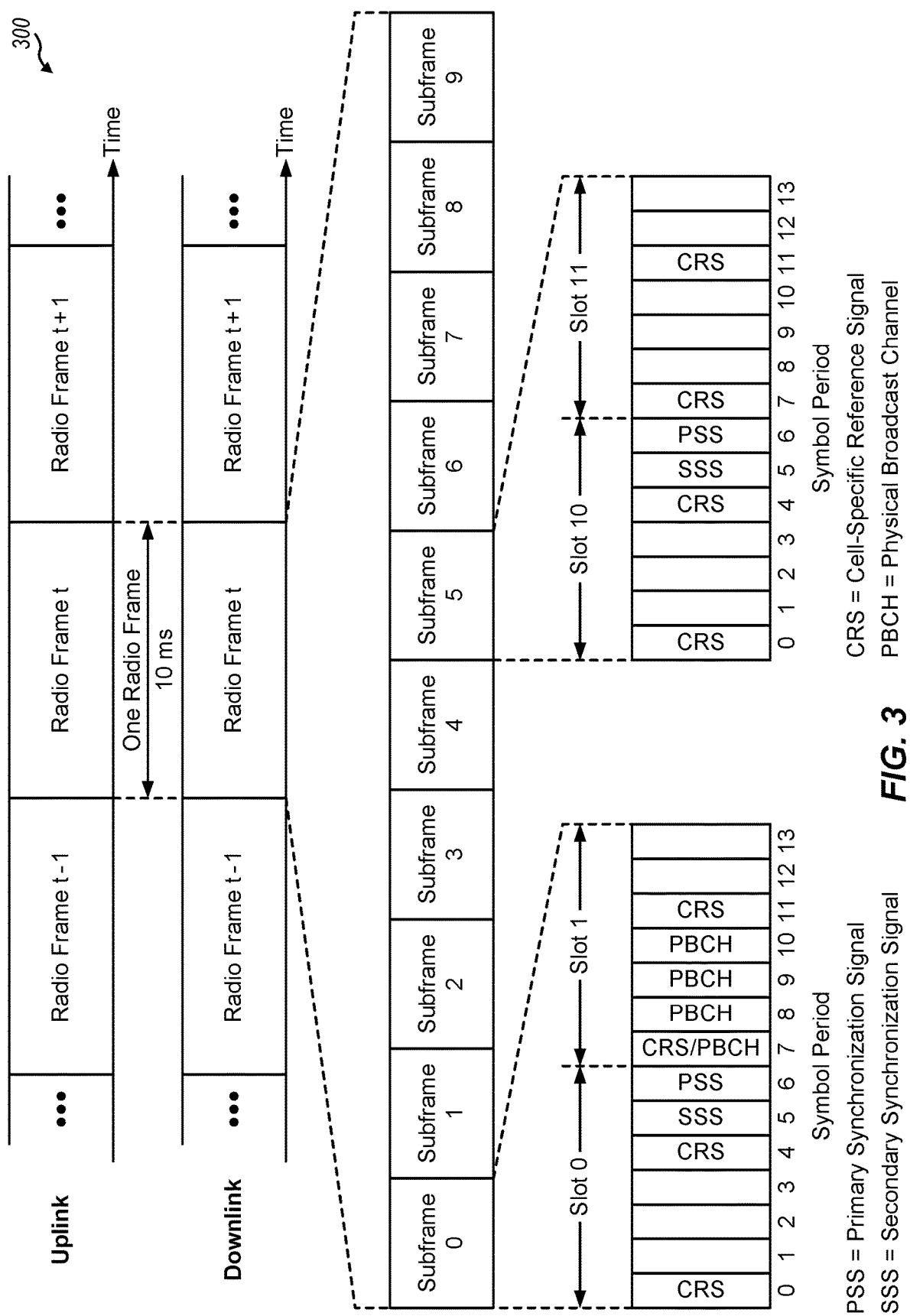
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

In other systems, (e.g., such as NR or 5G systems), a base station may transmit these or other signals in these locations or in different locations of the subframe.

Figure 4:
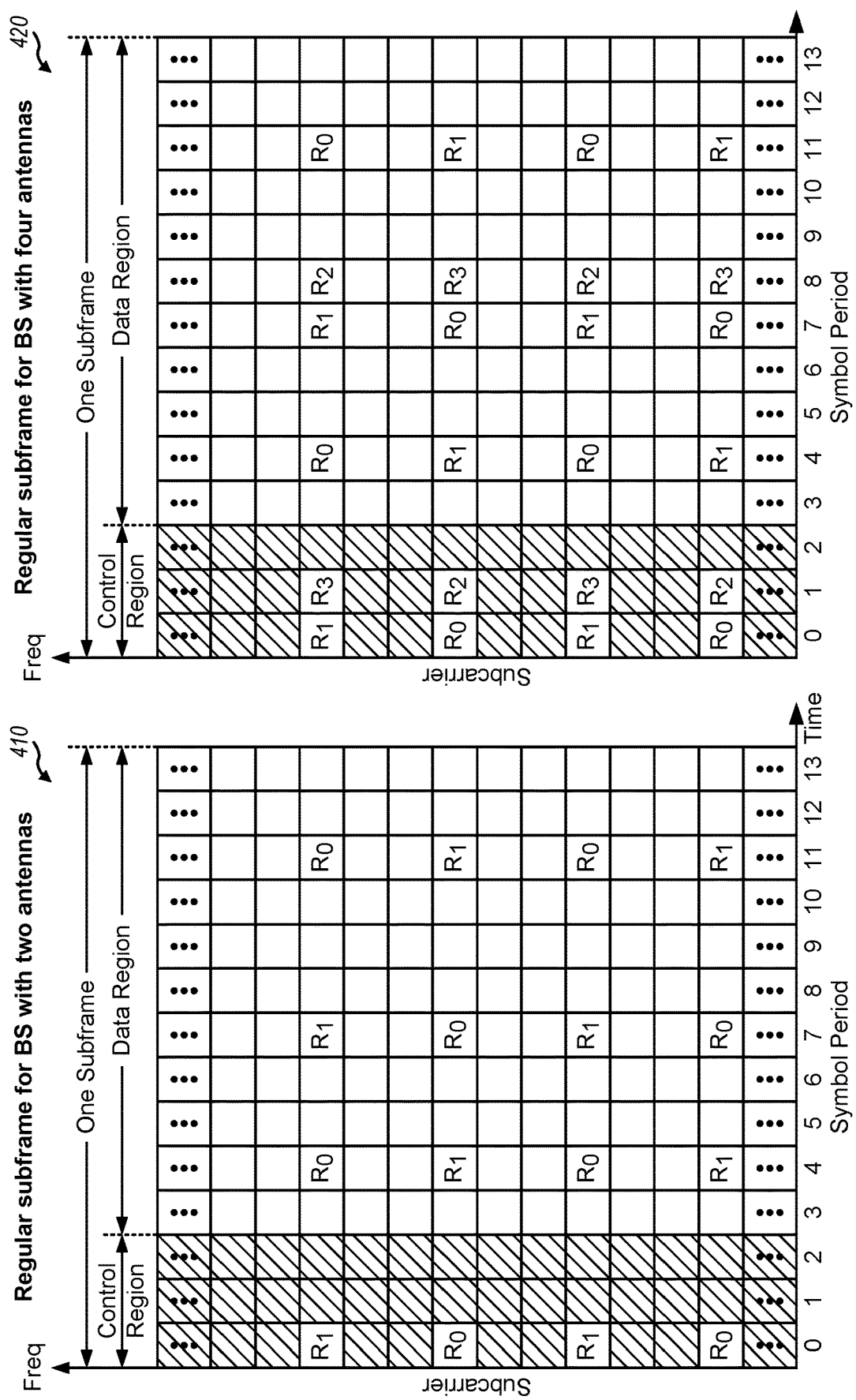
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS, and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, ..., Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

The focus of traditional LTE design (e.g., for legacy wideband devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as mentioned above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. As a reference example, in some systems (such as LTE Rel-13), the narrowband UE may be limited to a particular narrowband assignment (e.g., of no more than six resource blocks (RBs)) within the available system bandwidth. However, as described below with regard to FIGS. 5A and 5B, the narrowband UE may be able to re-tune (e.g., operate and/or camp) to different narrowband regions within the available system bandwidth of the LTE system, for example, in order to co-exist within the LTE system.

As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UE may be able to receive the legacy PBCH with one or more additional repetitions of the PBCH across multiple subframes. As another example, the narrowband UE may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to or from the narrowband UE) based on its link budget limitation. For example, in some cases, the narrowband UE may operate in a normal coverage mode in which there is little to no repetition (e.g., the amount of repetition needed for the UE to successfully receive and/or transmit a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, e.g., also for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

For MTC, narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with wideband UEs. For example, as compared to conventional paging messages used in LTE, narrowband UEs may be able to monitor and/or receive paging messages that wideband UEs may not be able to monitor and/or receive. Similarly, as compared to conventional random access response (RAR) messages used in a conventional random access procedure, narrowband UEs may be able to receive RAR messages that also may not be able to be received by wideband UEs. The new paging and RAR messages associated with narrowband UEs may also be repeated one or more times (e.g., "bundled"). In addition, different numbers of repetitions (e.g., different bundling sizes) for the new messages may be supported.

FIGS. 5A and 5B illustrate examples of how narrowband UEs in MTC and/or eMTC operation may co-exist within a wideband system (e.g., 1.4/3/5/10/15/20 MHz), such as LTE. As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by narrowband UEs may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, such as LTE Release 13, each narrowband UE may operate within one narrowband region (e.g., at 1.4 MHz or 6 RBs) at a time. In other cases, such as LTE Release 14, a narrowband UE may operate on a 5 MHz narrowband region (e.g., using 25 RBs).

At any given time, narrowband UEs (e.g., in eMTC) may re-tune to other narrowband regions in the wider system bandwidth. In some examples, multiple narrowband UEs may be served by the same narrowband region. In yet other examples, different combinations of narrowband UEs may be served by one or more same narrowband regions and/or one or more different narrowband regions.

The narrowband UEs may operate (e.g., monitor/receive/transmit) within the narrowband regions for various different operations. For example, as shown in FIG. 5B, a first narrowband region 560 of a subframe 552 may be monitored by one or more narrowband UEs for either a PSS, SSS, PBCH, MTC signaling, or paging transmission from a BS in the wireless communication network. As also shown in FIG. 5B, a second narrowband region 562 of a subframe 554 may be used by narrowband UEs to transmit a RACH or data previously configured in signaling received from a BS. In some cases, the second narrowband region may be utilized by the same narrowband UEs that utilized the first narrowband region (e.g., the narrowband UEs may have re-tuned to the second narrowband region to transmit after monitoring in the first narrowband region). In some cases (although not shown), the second narrowband region may be utilized by different narrowband UEs than the narrowband UEs that utilized the first narrowband region.

Certain systems may provide narrowband UEs (e.g., eMTC UEs) with coverage enhancements of up to 20 dB to support low cost MTC devices (e.g., such as bandwidth reduced low complexity (BL) or coverage enhancement (CE) users) with a single antenna and a basic receiver, and/or located in cell edges to connect. That is, eMTC UEs and eNB may perform measurements at low SNRs (e.g., −15 dB to −20 dB). As noted, in order to achieve coverage enhancement, multiple repetitions (e.g., bundling) of the same message (with different redundancy versions) may be transmitted over one or more subframes.

Although the examples described herein assume a narrowband of 6 RBs, those skilled in the art will recognize that the techniques presented herein may also be applied to different sizes of narrowband regions (e.g., 25 RBs).

In the case of NB-IoT, the wireless communication network (e.g., LTE Release 13, or greater) may support deployments using one physical resource block (PRB) (e.g., 180 kHz+20 kHz guard band) for narrowband operation (e.g., NB-IoT) with different deployment modes. In one example, NB-IoT may be deployed in-band and coexist with legacy GSM/WCDMA/LTE system(s) deployed in the same frequency band, for example, using resource blocks within a wider system bandwidth. Wideband LTE channel, for example, may be deployed in various bandwidths between 1.4 MHz to 20 MHz, and there may be a dedicated PRB for use by NB-IoT, or the RBs allocated for NB-IoT may be dynamically allocated (e.g., by an eNB). In an in-band deployment, NB-IoT may use one resource block (e.g., one PRB or 180 kHz) within the wider system bandwidth of an LTE network. In this case, the 180 kHz bandwidth for the resource block may be aligned with a wideband LTE resource block. In some deployments, NB-IoT may be deployed in a standalone mode of operation. In a standalone deployment, one 180 kHz carrier may be used to carry NB-IoT traffic and GSM spectrum may be reused. In some deployments, NB-IoT may be deployed in the unused resource blocks within a LTE carrier guard-band. In this deployment, the 180 kHz RB within the guard band may be aligned with a 15 kHz tone grid of wideband LTE, for example, in order to use the same FFT and/or reduce interference to in-band legacy LTE communications.

As noted, while aspects of the examples described herein may be associated with LTE technologies, aspects of the present disclosure may be applicable with other wireless communication systems, such as NR or 5G technologies. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)).

In NR, the RAN may include a central unit (CU) and distributed units (DUs). A NR BS (e.g., gNB, 5G Node B, Node B, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases, DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
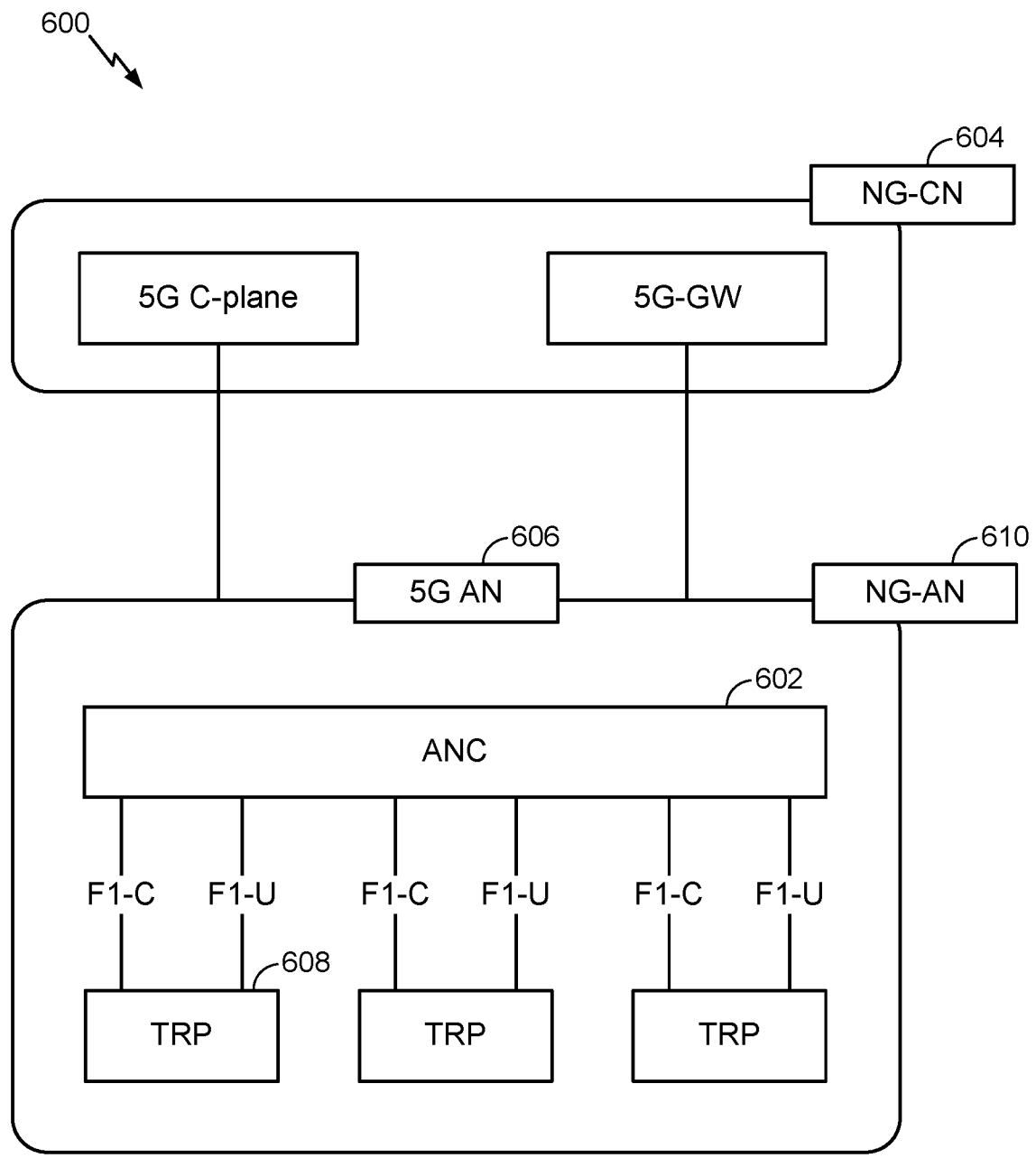
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at the ANC. The backhaul interface to neighboring next generation access nodes (NG-ANs) may terminate at the ANC. The ANC may include one or more TRPs 608 (which may also be referred to as BSs, NR BSs, Node Bs, 5G NBs, APs, gNB, or some other term). As described above, a TRP may be used interchangeably with "cell."

The TRPs 608 may be a distributed unit (DU). The TRPs may be connected to one ANC (ANC 602) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 600 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 610 may support dual connectivity with NR. The NG-AN may share a common fronthaul for LTE and NR.

The architecture may enable cooperation between and among TRPs 608. For example, cooperation may be preset within a TRP and/or across TRPs via the ANC 602. According to aspects, no inter-TRP interface may be needed/present.

According to aspects, a dynamic configuration of split logical functions may be present within the architecture 600. The PDCP, RLC, MAC protocol may be adaptably placed at the ANC or TRP.

According to certain aspects, a BS may include a central unit (CU) (e.g., ANC 602) and/or one or more distributed units (e.g., one or more TRPs 608).

Figure 7:
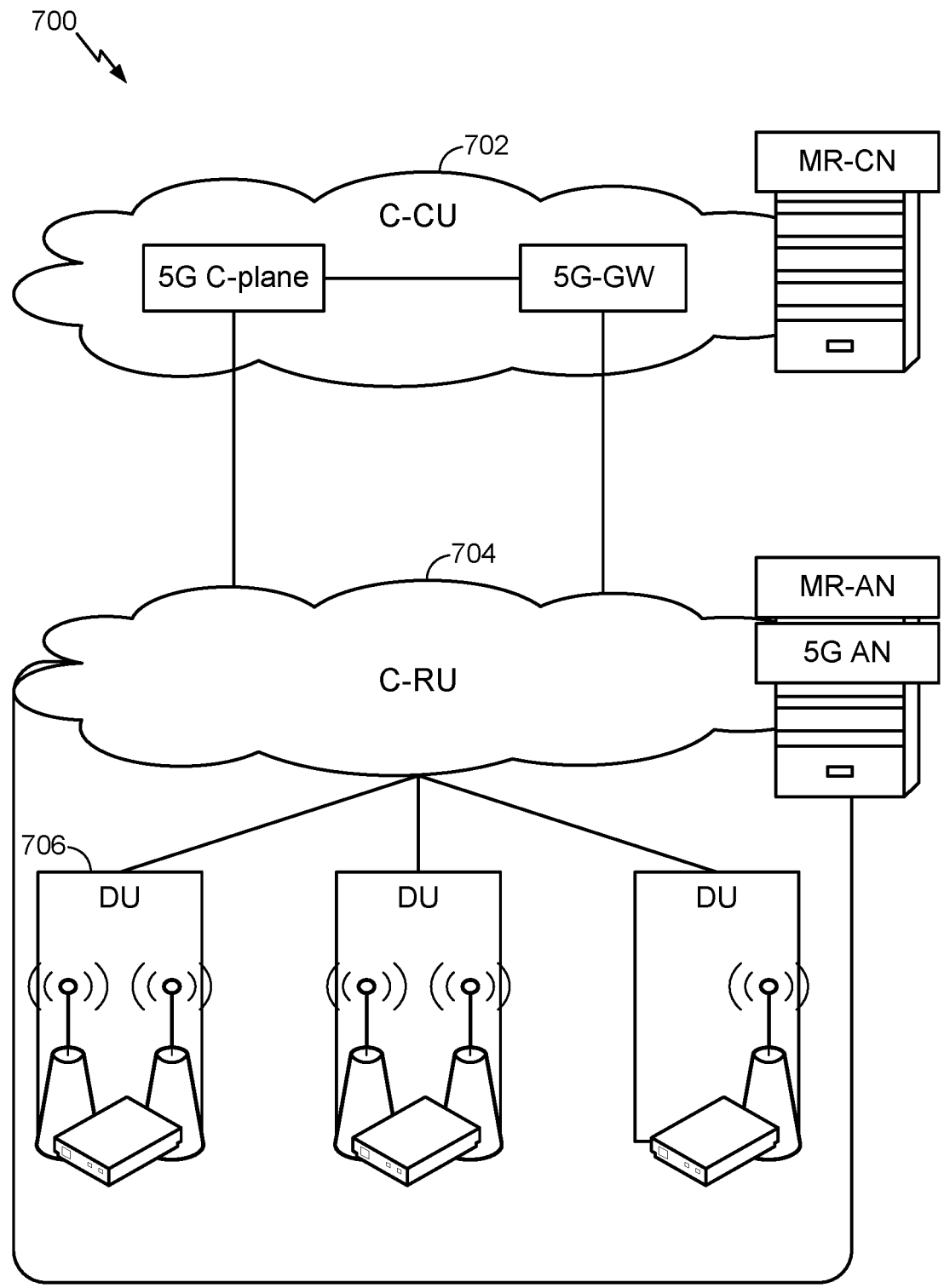
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. The C-CU may be centrally deployed. C-CU functionality may be offloaded (e.g., to advanced wireless services (AWS)), in an effort to handle peak capacity.

A centralized RAN unit (C-RU) 704 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 8:
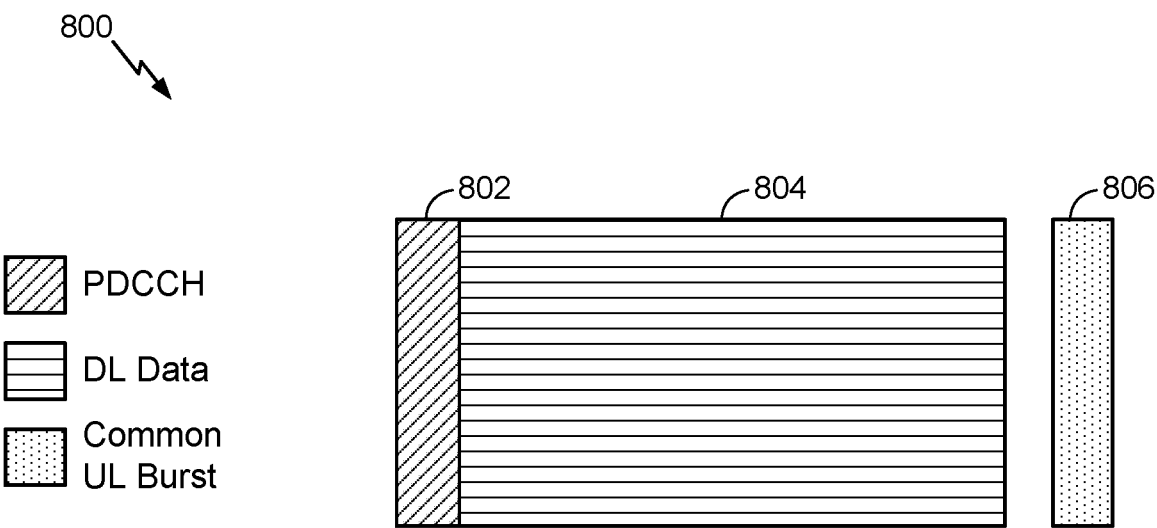
FIG. 8 is a diagram illustrating an example of a downlink (DL)-centric subframe, in accordance with certain aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
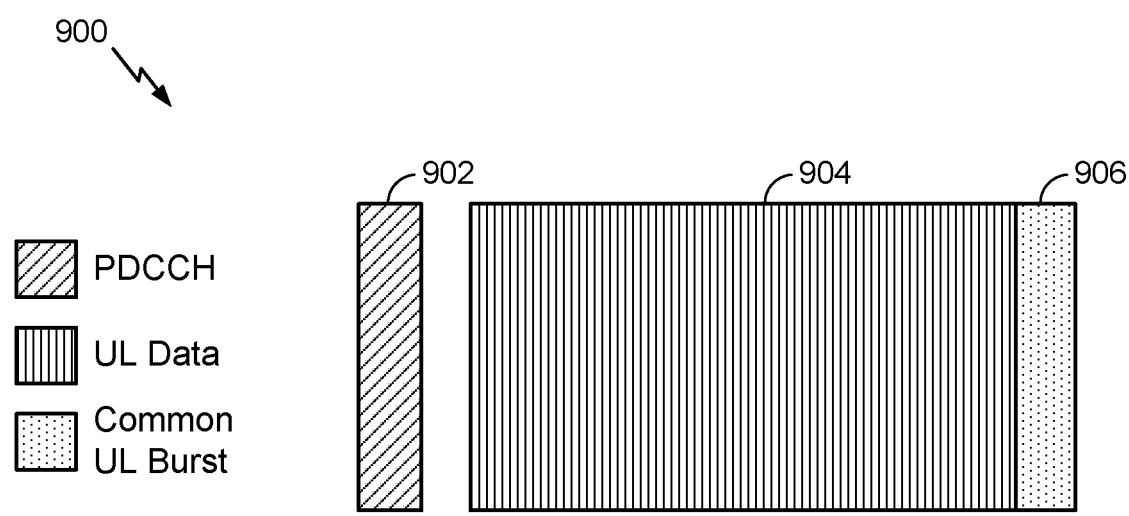
FIG. 9 is a diagram illustrating an example of an uplink (UL)-centric subframe, in accordance with certain aspects of the present disclosure.

FIG. 9 is a diagram 900 showing an example of an UL-centric subframe. The UL-centric subframe may include a control portion 902. The control portion 902 may exist in the initial or beginning portion of the UL-centric subframe. The control portion 902 in FIG. 9 may be similar to the control portion 802 described above with reference to FIG.

8. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 806 described above with reference to FIG. 8. The common UL portion 906 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Certain systems (e.g., eMTC, NB-IoT, etc.) may configure (e.g., via RRC signaling) narrowband UE(s) (e.g., CAT-M (Category M)/CAT-NB (Category NB-IoT) UE(s)) to receive multiple repetitions on the downlink channel. For example, control messages (e.g., MPDCCH, NPDCCH) and/or data (e.g., MPDSCH, NPDSCH) may be transmitted and repeated over several subframes to the narrowband (e.g., eMTC/NB-IoT) UEs. The repetitions (e.g., redundancy in time) are generally configured to facilitate decoding (e.g., by the narrowband UE(s)) in adverse conditions, where the narrowband UE may be a low cost device with limited communication resources and may be expected to decode successfully in bad radio conditions (e.g., the UE may be in extended coverage).

Such narrowband devices may be deployed in remote places (e.g., as sensors) and be expected to operate for significant long periods of time. For example, in some cases, the UE may be expected to last as long as 10 years or more (e.g., in a remote location). However, operating in coverage enhancement mode can cause the UE to waste power, and therefore reduce the amount of time that the UE is able to operate once deployed.

For example, narrowband UEs are generally expected to be in an active state when monitoring for downlink transmissions from a base station. Using paging as a reference example, when monitoring for paging messages, the UE may transition from a low power state (mode) or sleep mode to a higher power state (e.g., active power state) to monitor for downlink channel(s) (e.g., MPDCCH/NPDCCH) transmitted from the base station. As noted, the base station may repeat the downlink channel(s) over one or more subframes to ensure that the UE is able to receive/decode the downlink channel(s). In current systems, however, the UE is generally expected to be awake (e.g., active power state) for the entire duration of the repetitions in order to decode the downlink channel(s), regardless of whether the UE has decoded one of the repetitions of the downlink channel(s) (e.g., in an earlier subframe).

Figure 10:
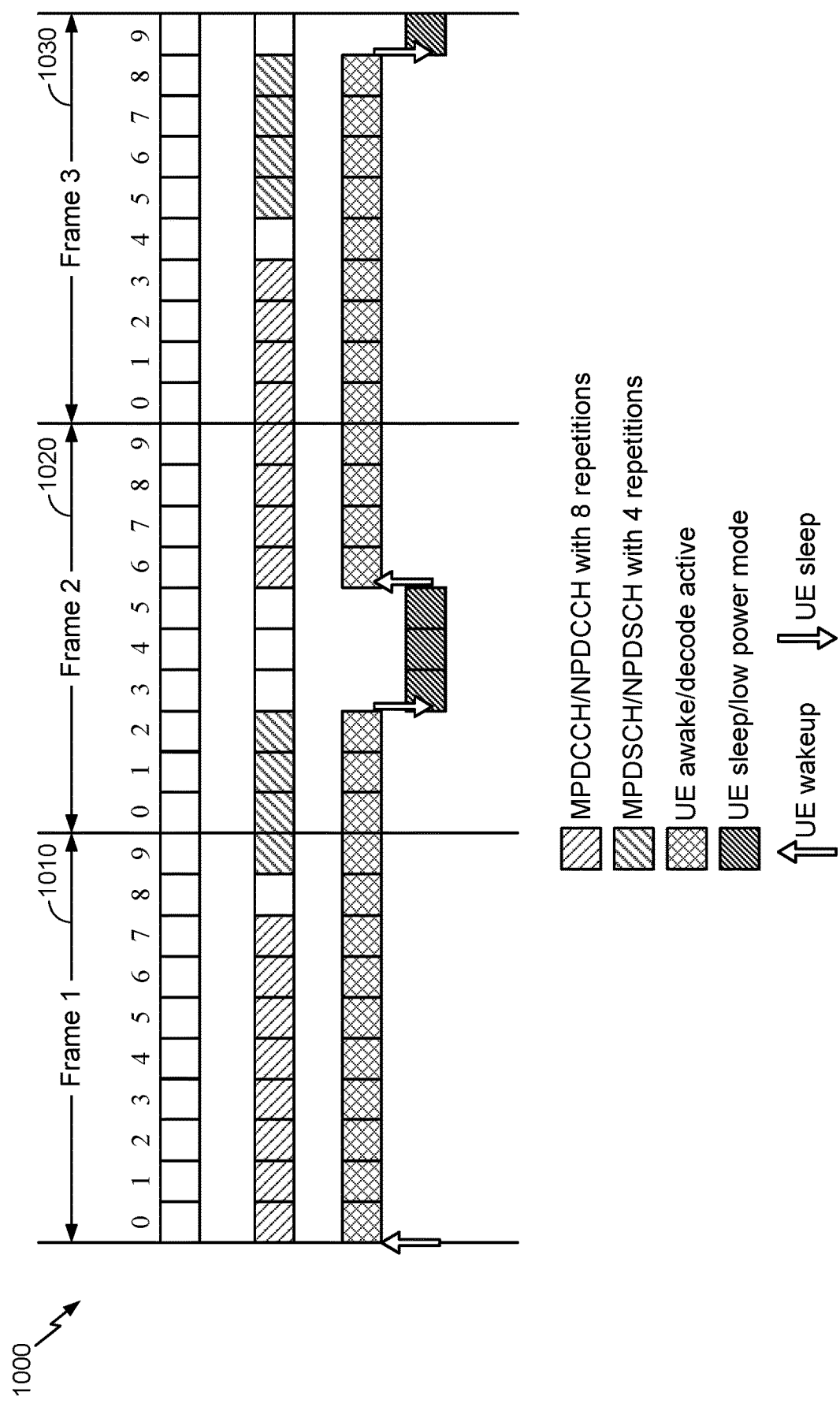
FIG. 10 illustrates an example CAT-M DL wakeup configuration, in accordance with certain aspects of the present disclosure.

FIG. 10 illustrates an example DL wakeup configuration 1000 (e.g., for paging in eMTC/NB-IoT) where a downlink control channel (e.g., MPDCCH/NPDCCH) and downlink data channel (e.g., MPDSCH/NPDSCH) are repeated over frames 1010-1030 to achieve redundancy over time, according to aspects of the present disclosure. As shown, the UE transitions to and remains in an active power state (e.g., active decode) for eight repetitions of the control channel (across subframes 0-7 of frame 1010) and four repetitions of the data channel (across subframe 9 of frame 1010 and subframes 0-2 of frame 1020). The UE then transitions to a low power mode (for subframes 3-5 of frame 1020) until the next paging occasion and subsequently transitions to an active power state for the next (e.g., paging occasion) set of repetitions of the control channel (across subframes 6-9 of frame 1020 and subframes 0-8 of frame 1030) and the data channel (across subframes 5-8 of frame 1030).

In some cases, however, there may be situations in which the UE is able to transition to a low power state earlier (and thereby save power), e.g., by terminating early the decoding of repetitions of the control and/or data channels. As described below, in some aspects, the UE may terminate the decode process when the UE successfully decodes (e.g., there is a cyclic redundancy check (CRC) pass) the channel(s) well ahead of the last repetition. In some aspects, the UE may terminate the decode process when the UE concludes the nonexistence of the downlink channel(s) based on examining CRC failures at an early stage at a good SNR. In some aspects, the UE may terminate the decode process after the UE has received an estimated number of repetitions of the downlink channel(s) needed for successfully decoding the downlink channel(s). In some aspects, the UE may terminate the decode process of MPDSCH/NPDSCH when the UE determines that MPDSCH/NPDSCH cannot be detected based on a SNR threshold.

By providing techniques for terminating the decode process, e.g., when certain conditions described herein are met, aspects presented herein can enable the UE to significantly save power by switching to a low power mode, as opposed to staying in an active power state for the entire duration of the repetitions.

Figure 11:
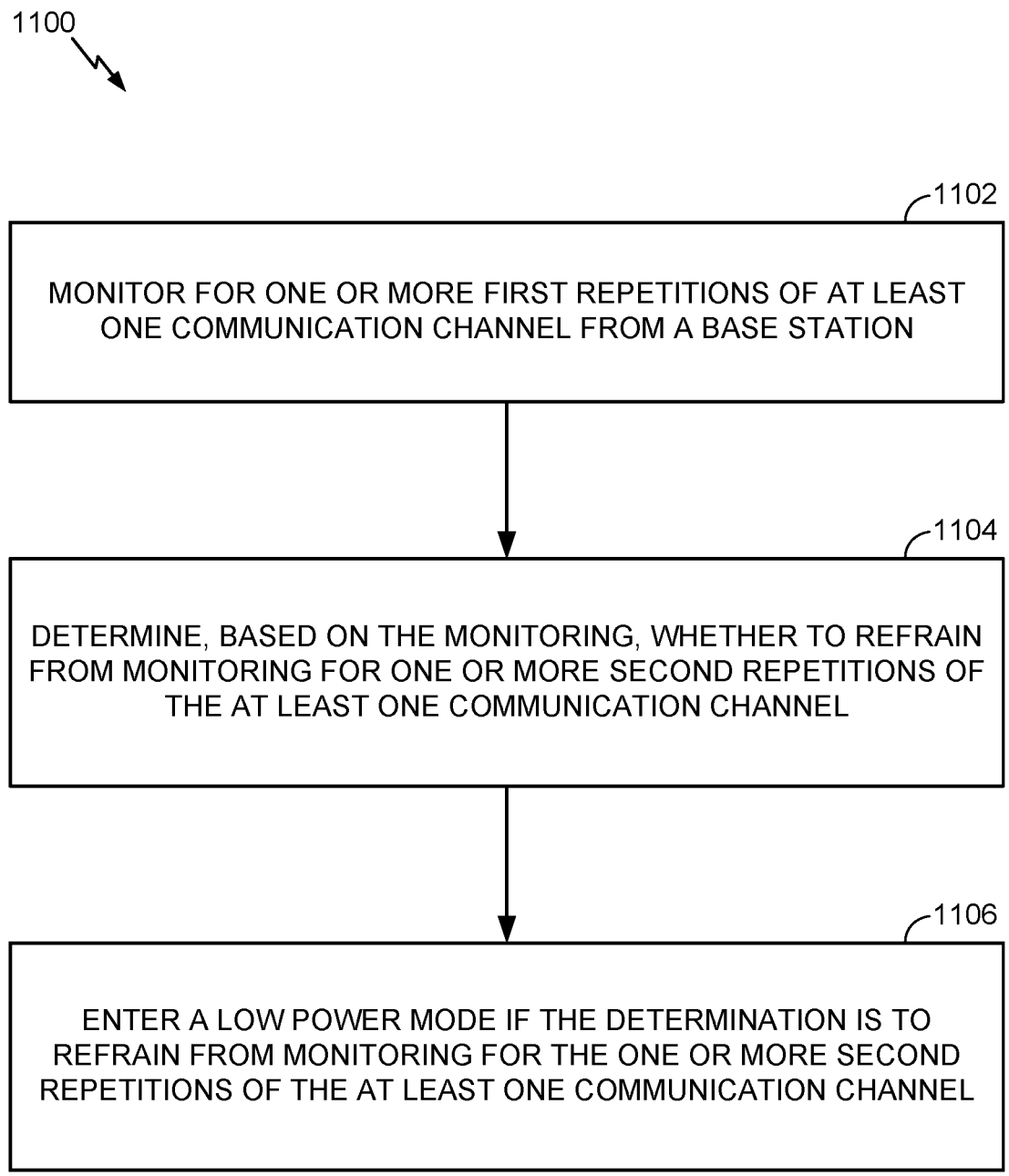
FIG. 11 illustrates an exemplary operation for wireless communications that may be performed by an apparatus, in accordance with certain aspects of the present disclosure.

FIG. 11 is a flow diagram illustrating example operations 1100 for wireless communications, in accordance with certain aspects of the present disclosure. The operations 1100 may be performed, for example, by an apparatus (e.g., UE 120). The operations 1100 may begin, at 1102, where the apparatus monitors for one or more first repetitions of at least one communication channel from a base station. At 1104, the apparatus determines, based on the monitoring, whether to refrain from monitoring for one or more second repetitions of the at least one communication channel.

At 1106, the apparatus enters a low power mode if the determination is to refrain from monitoring for the one or more second repetitions of the at least one communication channel. In some aspects, the apparatus may enter the low power mode for a duration of the one or more second repetitions of the at least one communication channel. After the duration of the one or more second repetitions, the apparatus may exit the low power mode to monitor for one or more third repetitions of the at least one communication channel. The at least one communication channel may include a control channel (e.g., MPDCCH, NPDCCH), data channel (e.g., MPDSCH, NPDSCH), SIB, etc.

As noted, the UE may monitor for repetitions of communication channels for the entire duration of the repetitions, even if the UE has successfully decoded the communication channel in an earlier subframe. For example, when monitoring for repetitions of the downlink control channel (e.g., during a paging occasion), the UE may consider a control channel decode attempt as a success when CRC is passed and the repetition hypothesis attempted is the same as the decoded repetition level in the downlink control information. However, with current techniques, the UE in this case may still monitor for the remaining control channel repetitions. For example, the UE may attempt to decode the data channel (e.g., PDSCH) starting on a subframe "n+x" (where x is a predetermined number of subframes) if the last repetition of the control channel is on subframe "n." Thus, in this reference example, with current techniques, the UE may perform continuous monitoring of all the scheduled control channel repetitions regardless of an earlier decoding success, which can result in increased power consumption by the UE.

In some aspects, the UE, using techniques presented herein, may determine (e.g., at operation 1104) to refrain from monitoring for the one or more second repetitions of the at least one communication channel after decoding the at least one communication channel within the one or more first repetitions, and enter the low power mode (e.g., at operation 1106) during the one or more second repetitions of the at least one communication channel.

Figure 12:
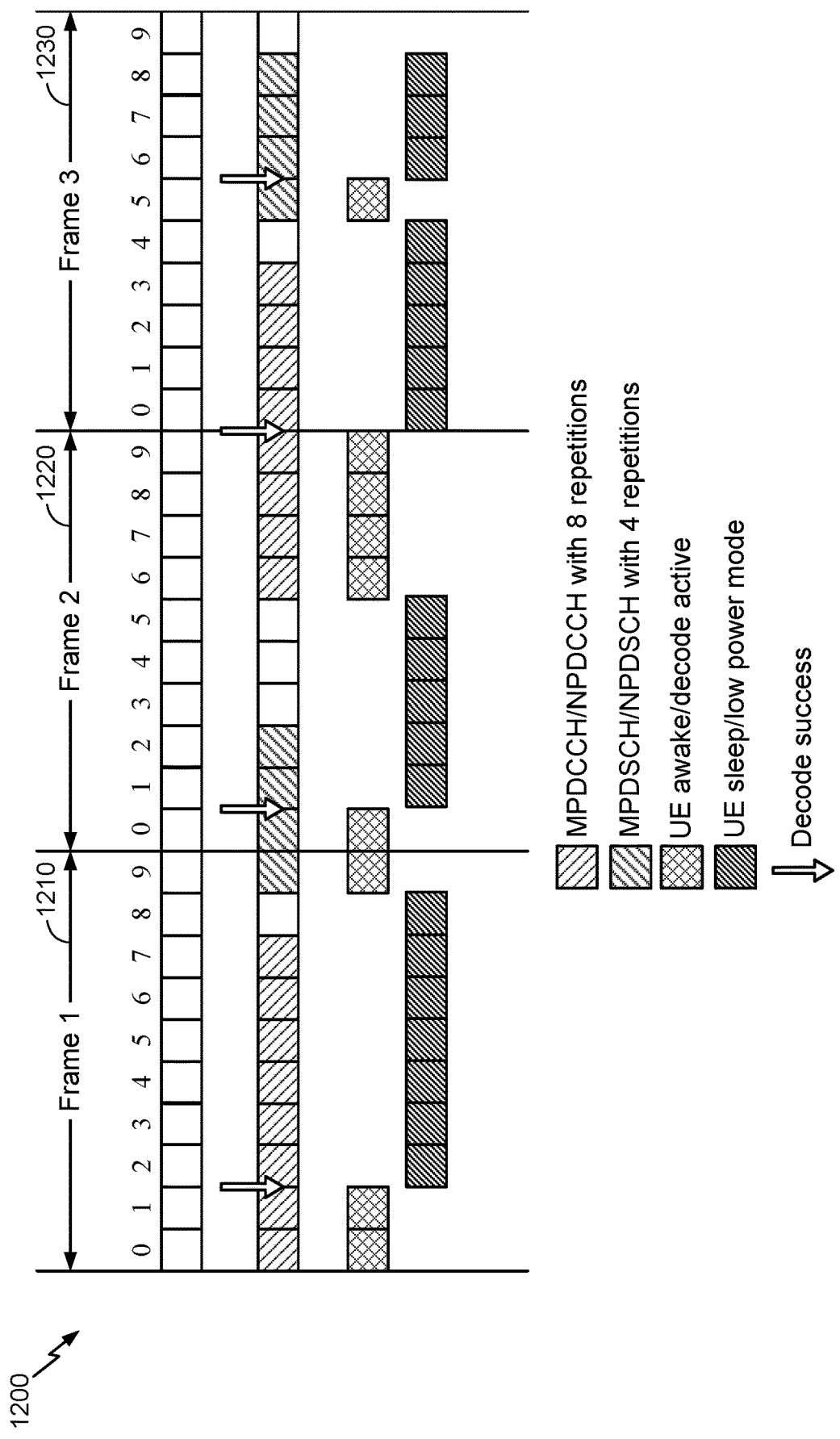
FIG. 12 illustrates an example scenario for performing an early termination of decoding of communication channels, in accordance with certain aspects of the present disclosure.

FIG. 12 illustrates one example scenario 1200 where the UE performs an early termination of decoding of communication channels in frames 1210-1230 after the downlink control channel (e.g., MPDCCH/NPDCCH) and downlink data channel (e.g., MPDSCH/NPDSCH) are decoded well ahead of the last repetition, according to certain aspects of the present disclosure. In this example, the UE may be configured (e.g., by a base station) to monitor the control channel for eight subframes (subframes 0-7 of frame 1210). The UE may be configured with the repetition size of the control channel via broadcast signaling (e.g., such as a SIB1 message), RRC signaling, etc. The control channel may indicate the data channel (e.g., PDSCH) allocation and repetition size of the data channel. In this example, the control channel indicates a PDSCH allocation with repetition size of four.

As shown, the UE may begin in an active power state to monitor for the repetitions of the control channel and may successfully decode the control channel within the first two subframes (subframes 0-1 of frame 1210). The decoding success of the control channel triggers the UE to transition to a low power mode for the remaining six repetitions of the control channel (across subframes 2-7 of frame 1210), thus enabling the UE to save power (e.g., relative to the power consumed by being awake for the remaining six repetitions of the control channel). After the last repetition of the control channel, the UE is configured to wake up on the next reception of interest (e.g., PDSCH), and begin monitoring four repetitions of PDSCH (across subframe 9 of frame 1210 and subframes 0-2 of frame 1220). The UE is able to decode PDSCH within the first two subframes (repetitions across subframe 9 of frame 1210 and subframe 0 of frame 1220), thereby triggering the UE to transition to sleep mode. The UE is able to remain in sleep mode for the remaining two repetitions of PDSCH (across subframes 1-2 of frame 1220) and over one or more additional subframes (subframes 3-5 of frame 1220) until the next paging occasion for the control channel.

By terminating further decoding of repetitions of the downlink channel(s) in situations where the downlink channel(s) have been decoded from an earlier repetition, the UE can significantly increase the amount of power saved during operation (e.g., when monitoring for paging messages).

Figure 13:
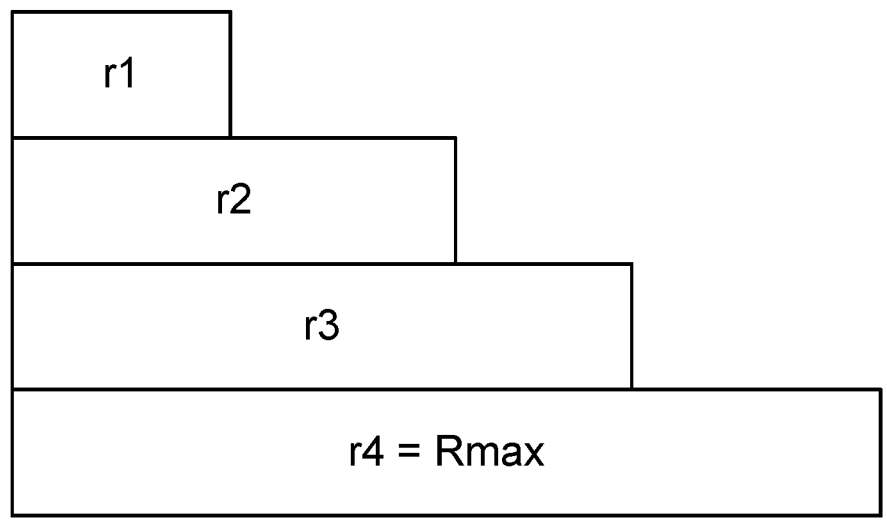
FIG. 13 illustrates an example of a repetition hypothesis for a paging search space, in accordance with certain aspects of the present disclosure.

With current techniques, the UE generally monitors downlink channel(s) for the entire duration of the repetitions, regardless of the number of decoding failures detected by the UE. However, in cases where the UE is configured with a large number of repetitions, monitoring for downlink channel(s) in this manner can increase the UE's power consumption. Using paging as a reference example, the UE may wake up from idle sleep for page monitoring and begin monitoring the downlink control channel (e.g., MPDCCH) at a paging occasion to determine if a paging message is allocated for the UE (e.g., in the downlink data channel). The UE may generally attempt four levels of repetition hypothesis (r1, r2, r3, r4) based on the maximum repetition ($r_{max}$) configured for the UE. FIG. 13 illustrates a reference example of a repetition hypothesis for a paging (MPDCCH/NPDCCH) search space (e.g., Type 1 common search space).

As shown, for a downlink control channel candidate with a number of repetitions ri (where i={1,2,3,4}) and $r_{max}$=8, the UE may monitor a single candidate which starts at the beginning of the search space (e.g., paging occasion subframe). The UE use a lookup table to determine the four levels of repetition hypothesis for monitoring for control channel. The parameter $r_{max}$ may be indicated to the UE by a RRC parameter (e.g., mpdcch-NumRepetitionpaging-r13, npdcch-NumRepetitionpaging-r13), which is cell-specific and broadcasted by the base station via SIB. Table I illustrates a reference example of repetitions levels for Type 1-MPDCCH common search space.

TABLE I

Repetition levels for Type 1-MPDCCH common search space

| $r_{max}$ | r1 | r2 | r3 | r4 |
|---|---|---|---|---|
| 256 | 2 | 16 | 64 | 256 |
| 128 | 2 | 16 | 64 | 128 |
| 64 | 2 | 8 | 32 | 64 |
| 32 | 1 | 4 | 16 | 32 |
| 16 | 1 | 4 | 8 | 16 |

TABLE I-continued

Repetition levels for Type 1-MPDCCH common search space

| $r_{max}$ | r1 | r2 | r3 | r4 |
|---|---|---|---|---|
| 8 | 1 | 2 | 4 | 8 |
| 4 | 1 | 2 | 4 | — |
| 2 | 1 | 2 | — | — |
| 1 | 1 | — | — | — |

Continuing with the example where $r_{max}$=8, the UE may first monitor for the control channel at the first repetition level (r1=1). If the UE is unable to successfully decode MPDCCH at the first repetition level, the UE may monitor for the control channel at the second repetition level (r2=2). If unsuccessful, the UE may monitor for the control channel at the third repetition level (r3=4), and so on. Thus, when the UE is unable to successfully decode the control channel, the UE may stay in an active state in order to attempt every repetition hypothesis. However, performing continuous monitoring of all the scheduled control channel repetitions (regardless of repeated decoding failures) can result in increased power consumption at the UE (e.g., in some cases the UE can be configured with 256 repetitions of MPDCCH/NPDCCH).

In some aspects, the UE, using techniques presented herein, may determine (e.g., at operation 1104) to refrain from monitoring for the one or more second repetitions of the at least one communication channel after detecting (e.g., at operation 1102) one or more decoding failures of the at least one communication channel during the one or more first repetitions and detecting (e.g., at operation 1102) that channel quality between the UE and the base station satisfies a predetermined condition (e.g., is at or above a threshold). For example, there may be situations in which the UE is able to decode the control channel using a smaller number of control channel repetitions than that scheduled by the base station (e.g., the UE may detect that a SNR condition is at or above a threshold). Thus, in cases where the UE observes one or more CRC failures and determines SNR is very high (e.g., above a threshold), the UE may conclude that the control channel is absent (e.g., unable to be decoded even with the remaining repetitions) and skip further decoding of the control channel. The UE may then switch to low power mode for the rest of the repetitions and wake up on the next reception of interest thereby saving power (e.g., as compared to being awake for the entire duration of the repetitions).

Figure 14:
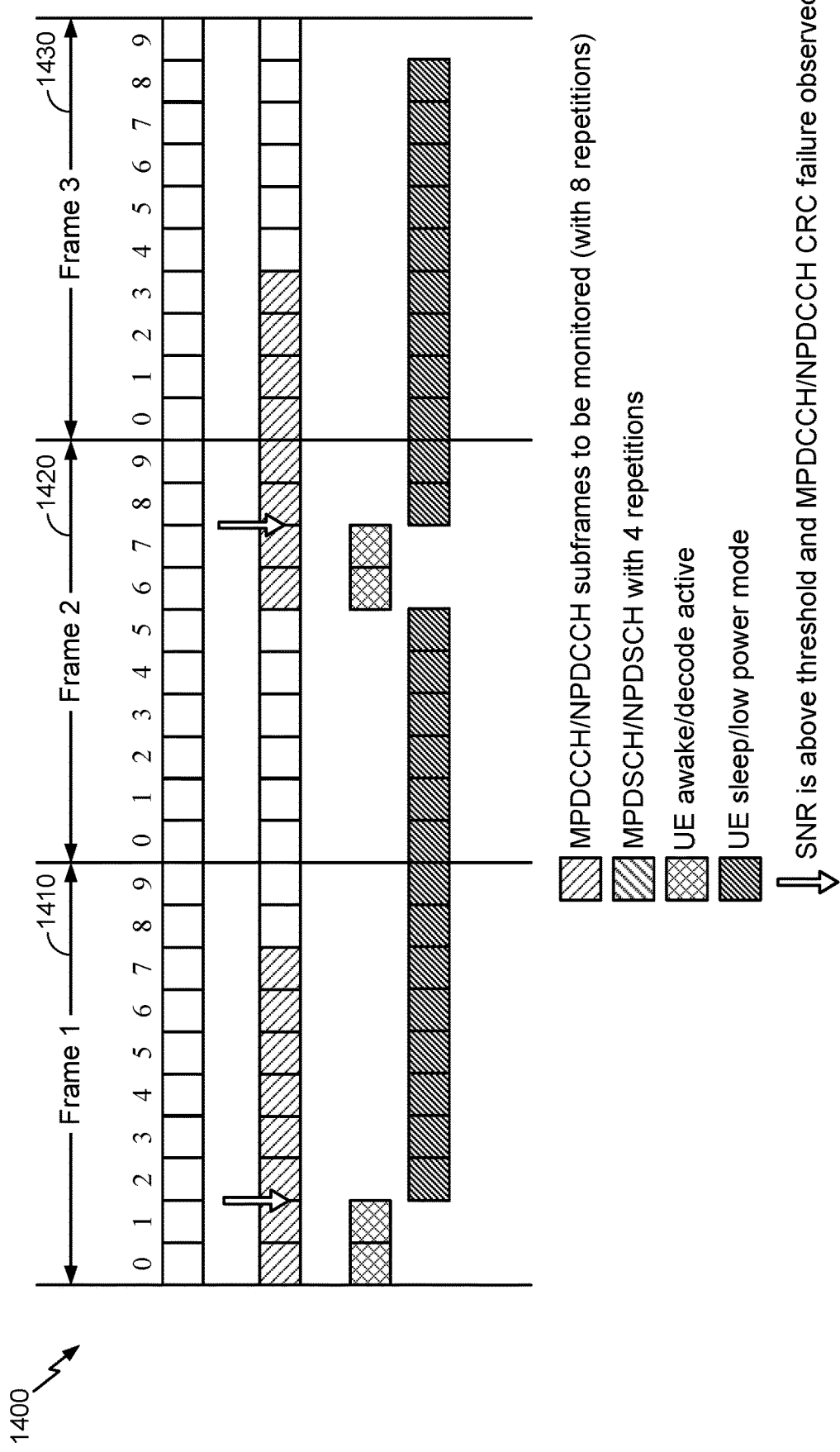
FIG. 14 illustrates an example scenario for performing an early termination of decoding of communication channels, in accordance with certain aspects of the present disclosure.

FIG. 14 illustrates one example scenario 1400 where the UE performs an early termination of decoding of communication channels in frames 1410-1430 after detecting one or more CRC failures of the control channel (e.g., MPDCCH/NPDCCH) in the presence of good radio channel conditions (e.g., above a threshold), according to certain aspects of the present disclosure.

In this example, the UE is configured to monitor the control channel for eight subframes (subframes 0-7 of frame 1410). Additionally, the UE detects that it is in good radio channel conditions (e.g., SNR is above a threshold). However, in this example, the control channel is not transmitted by the base station. As a result, the UE may observe one or more CRC failures after one or more subframes. After the second subframe (subframe 1 of frame 1410, or in general any number of subframes), the UE can conclude (e.g., based on the determination that radio channel conditions are above a threshold) that if there was a genuine control channel, the UE should have seen a CRC pass by a certain number of repetitions. Thus, if the UE doesn't see a CRC pass, the UE can determine that the control channel is absent and trigger a transition to sleep mode. As shown, for example, the UE transitions to sleep mode after monitoring for two repetitions of the control channel (across subframes 0-1 of frame 140) and stays in sleep mode until the next paging occasion (e.g., in frame 1420).

In some aspects, the UE may determine the estimated number of repetitions for successfully decoding the control channel (e.g., in good channel conditions) based on the configured repetition hypothesis. For example, if UE determines that SNR>X dB, the UE may choose to monitor at most the r1 repetition hypothesis. If there is no CRC pass, the UE may ignore the remaining repetition hypothesis and go to sleep as there is a high probability that the UE with the good channel conditions (above a predetermined threshold) should be able to decode with the r1 hypothesis.

Note, while the UE in the above example monitors for the r1 repetition hypothesis, the UE may choose other repetition hypothesis levels. For example, in some cases, the UE may attempt one or more different repetition hypothesis based on different SNR thresholds. That is, the UE may choose to monitor for a first repetition hypothesis (e.g., r1) if SNR is above a first threshold; monitor for at least the first repetition hypothesis and a second hypothesis (e.g., r2) if SNR is above a second threshold; and so on. In some aspects, the first threshold may be larger than the second threshold.

In some cases, once the UE determines that CRC is passed for the control channel with lower repetition hypothesis than the value configured in the DCI payload, the UE may determine (e.g., based on its configured repetition level and the subframe in which it detected a decoding success) the number of remaining subframes until the data channel paging subframe. If the number of remaining subframes is greater than a threshold number of subframes, the UE may enter a sleep (idle mode) and wake up closer to the data channel paging subframe (e.g., where the paging message is expected). The UE may determine to enter sleep mode for different durations depending on the number of remaining subframes. In this manner, the UE can reduce power consumption (e.g., by shutting off software processes, hardware components, such as RF, etc.) in order to save battery life.

In some aspects, the UE may determine the estimated number (N, where N<$r_{max}$) of repetitions for successfully decoding the control channel (e.g., in good channel conditions) based on one or more channel condition estimates (e.g., SNR, Doppler estimates, etc.). The UE may use a predefined database of control channel decoding performance in various channel conditions to determine the value of N. The UE may perform a decoding attempt after N repetitions of the control channel. The UE may determine when the N repetitions will end based on the fixed start of the paging occasion (e.g., paging NPDCCH type 1 common search space may have a fixed start at the paging occasion subframe or next valid narrowband DL subframe).

Figure 15A:
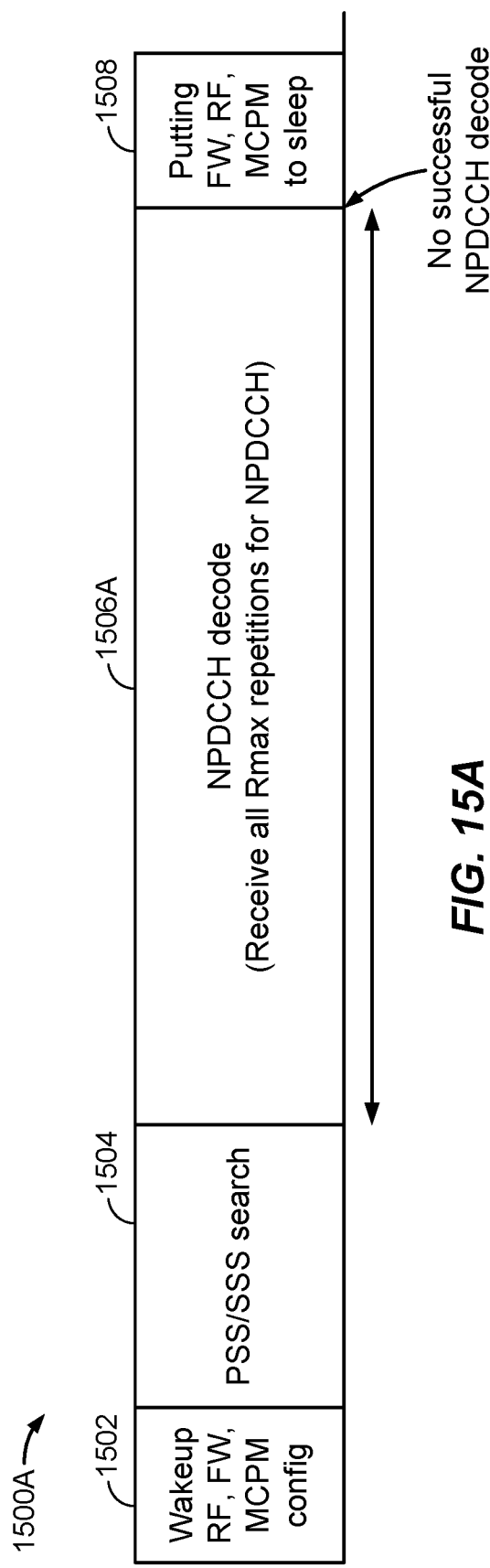
FIGS. 15A-B illustrates example timelines for monitoring a control channel, in accordance with certain aspects of the present disclosure.
Figure 15B:
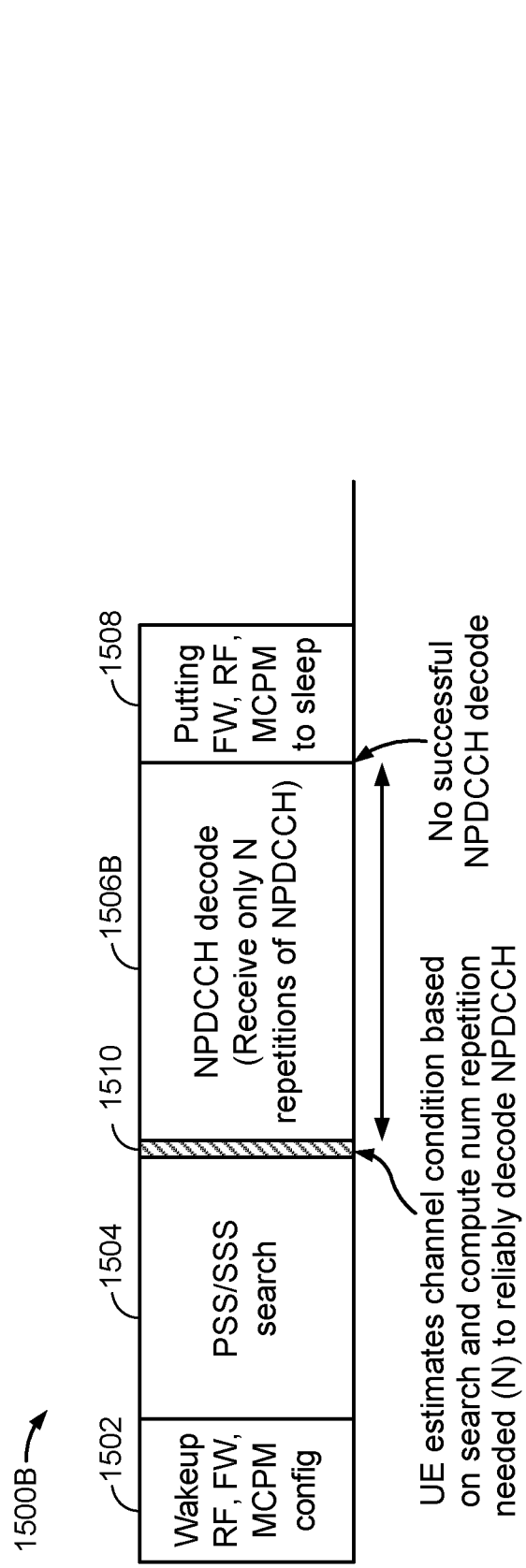

FIG. 15A illustrates a reference example of a timeline used for monitoring NPDCCH with current techniques and FIG. 15B illustrates a reference example of a timeline used for monitoring NPDCCH with the techniques presented herein, according to certain aspects of the present disclosure.

As shown in FIGS. 15A and 15B, the UE (at 1502) may transition from idle mode and wakeup RF, firmware (FW) and/or other software and/or hardware components (e.g., a modem clock power management (MCPM) configuration). At 1504, the UE may perform a search for PSS and SSS from the base station. The UE (at 1506A, 1506B) may monitor for one or more repetitions of NPDCCH. As shown in FIG. 15A, however, in the event the UE is unable to successfully decode NPDCCH, the UE still has to receive all repetitions of NPDCCH before reentering idle mode at 1508.

On the other hand, as shown in FIG. 15B, the UE using the techniques presented herein can substantially reduce power consumption during the NPDCCH decode (e.g., at 1506B) by determining an estimated number of repetitions for successfully decoding NPDCCH and monitoring NPDCCH for the estimated number of repetitions, as opposed to monitoring all the repetitions. For example, after PSS/SSS search at 1504, the UE (at 1510) may estimate the channel condition based on the search at 1504. The UE (at 1510) may determine the number of repetitions (N) for reliably decoding NPDCCH based on the estimated channel condition.

In some aspects, the UE may determine the value of N based on one or more generated tables stored at the UE. Each generated table may map estimates of a channel condition parameter to NPDCCH repetition values (for successfully decoding NPDCCH). The channel condition parameters may include SNR, Doppler estimate, RSRP, etc. The UE may generate the "channel condition estimate vs. NPDCCH repetition" table(s) based on a block error rate (BLER) criteria (e.g., <10% BLER, or some other percentage) for different types of channels/fading profiles. In some cases, the UE may not incur any additional complexity when generating the table(s), as the UE may have to do similar processing for radio link monitoring (RLM) while in a connected state.

As shown in FIG. 15B, as opposed to receiving all $r_{max}$ repetitions of NPDCCH, the UE (at 1506B) may monitor only the N repetitions of NPDCCH. At 1508, the UE may reenter idle mode. Doing so in this manner enables the UE to avoid monitoring for/receiving all $r_{max}$ repetitions of NPDCCH in the case of repeated decoding failures which, in turn, saves battery power of the UE.

Note, the early termination decoding scenarios in FIGS. 12 and 14-15 may be applied to Type 1 search space (SS) (e.g., for paging) and/or Type 2 SS and UE SS (UE specific search space) (e.g., DL unicast). In some cases, if applied to Type 1 SS, the power savings in idle mode may be significant (e.g., compared to remaining in active mode for all repetitions).

In some aspects, the UE may determine (e.g., at operation 1104) to refrain from monitoring for one or more second repetitions of the data channel (e.g., MPDSCH/NPDSCH) after detecting that channel quality between the UE and the base station is below a threshold, and enter the low power mode during the one or more second repetitions of the data channel. For example, in some cases, the UE may conclude that the data channel cannot be detected based on a SNR threshold at the early stage of repetition. The UE may then switch to low power mode for the rest of the repetitions and wake up on the next reception of interest to save power.

Figure 16:
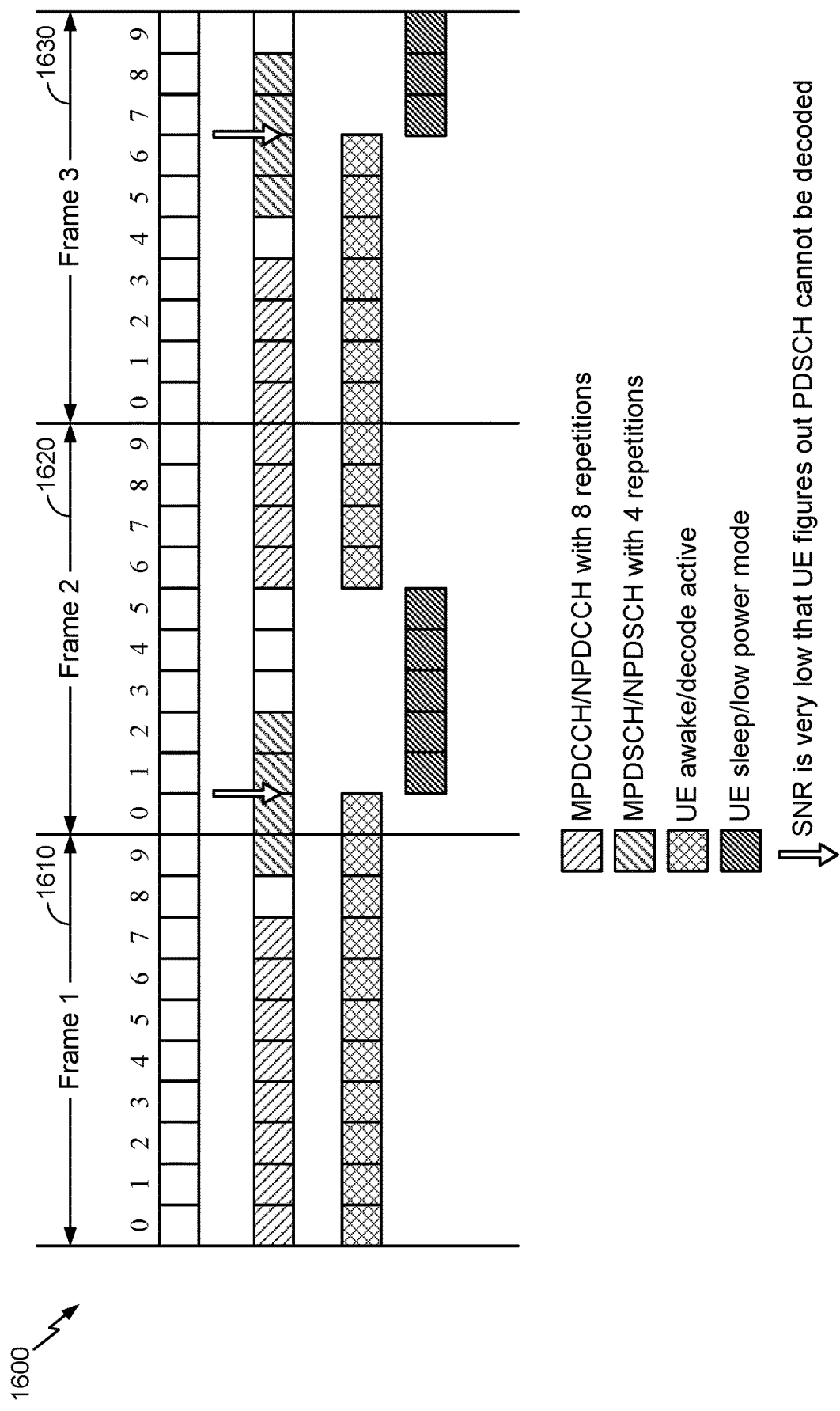
FIG. 16 illustrates an example scenario for performing an early termination of decoding of communication channels, in accordance with certain aspects of the present disclosure.

FIG. 16 illustrates one example scenario 1600 where the UE performs an early termination of decoding of a downlink data channel (e.g., MPDSCH/NPDSCH) in frames 1610-1630 in the case where the UE observes poor radio channel conditions (e.g., below a threshold), according to certain aspects of the present disclosure. As shown, the UE may be in an active state during the first two repetitions of the data channel (across subframe 9 of frame 1610 and subframe 0 of frame 1620). After the second repetition, the UE determines the data channel cannot be detected based on the poor radio channel conditions (e.g., SNR is below a threshold), and transitions to low power mode until the next paging occasion (e.g., for MPDCCH/NPDCCH).

In some aspects, the UE may determine whether to go sleep during the one or more second repetitions of the data channel based on the SNR variance. For example, if the SNR trend is improving, then the probability of successfully decoding the data channel may increase. In this case, the UE may stay in an active state for at least one or more of the second repetitions of the data channel. On the other hand, if the SNR trend is remaining below the SNR threshold, then the probability of successfully decoding the data channel may not increase. In this case, the UE may determine to go to sleep during the one or more second repetitions of the data channel.

In some aspects, the UE may update the SNR threshold corresponding to the probability of decoding the data channel, based on one or more parameters, such as a given location, time, etc. For example, the UE may assume that RF propagation is approximately steady for a given topography and/or interference/load is periodic for time of day for most cases, and apply different SNR thresholds based on the given topography, interference/load, etc. In some cases, the UE may determine the one or more parameters based on operating for a period of time, or the one or more parameters may be indicated to the UE (e.g., from a base station, or another UE).

Note that the examples in FIGS. 12 and 14-16 are provided merely as reference examples of how the techniques presented herein can be used by, for example, an IoT or narrowband device, such as eMTC or NB-IoT device, to perform an early termination of decoding of communication channels in order to transition to a low power mode to save power (relative to techniques in which the UE has to remain in an active power state for all repetitions). For example, while in the examples above, the UE is configured to monitor a control channel for eight repetitions and a data channel for four repetitions, those of ordinary skill in the art will recognize that the UE may be configured to monitor communication channels for any number of repetitions.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more antennas (such as antenna(s) 234 of the eNB 110 and/or antenna(s) 252 of the user equipment 120) and/or one or more modulators/demodulators (such as modulator(s)/demodulator(s) 232 of the eNB 110 and/or modulator(s)/demodulator(s) 254 of the UE 120). Additionally, means for transmitting and/or means for receiving may comprise one or more processors (e.g., Transmit Processors 220/264 and/or Receive Processors 238/258) configured to transmit/receive via the one or more antennas. Further, means for determining, means for monitoring, means for entering, means for (re)tuning, means for exiting, means for decoding, means for deciding, means for refraining, and/or means for performing may comprise one or more processors, such as the Transmit Processor 220, the Receive Processor 238, or the Controller/Processor 240 of the eNB 110 and/or the Transmit Processor 264, the Receive Processor 258, or the Controller/Processor 280 of the user equipment 120.

As used herein, the term "determining" encompasses a wide variety of actions. For example, "determining" may include calculating, computing, processing, deriving, investigating, looking up (e.g., looking up in a table, a database or another data structure), ascertaining, concluding, deciding, and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) of a UE (e.g., UE 120) or BS (e.g., eNB 110) for receiving/obtaining structures processed by an RF front end (e.g., via a bus). Similarly, the term transmitter may refer to an RF transmitter of an RF front end or an interface (e.g., of a processor) of a UE (e.g., UE 120) or BS (e.g., eNB 110) for outputting structures to an RF front end for transmission (e.g., via a bus). According to certain aspects, a receiver and transmitter may be configured to perform operations described herein. Additionally a transmitter may be configured to perform any transmitting functions described herein such as transmitting information associated with one or more channels scheduled in different bandwidths.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, phase change memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, or combinations thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read- Only Memory), EEPROM (Electrically Erasable Programmable Read-Only Memory), phase change memory, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a first number of repetitions of at least one control channel communication from a base station to monitor based at least in part on a channel quality between the UE and the base station, wherein the first number of repetitions is less than a second number of repetitions of the at least one control channel communication configured for the UE;
   monitoring for the first number of repetitions of the at least one control channel communication from the base station;
   after monitoring for the first number of repetitions of the at least one control channel communication, refraining from monitoring for one or more additional repetitions of the at least one control channel communication; and
entering a low power mode during the one or more additional repetitions of the at least one control channel communication.

2. The method of claim 1, wherein the first number of repetitions of the at least one control channel communication is an estimated number of repetitions for successfully decoding the at least one control channel communication based on the channel quality between the UE and the base station.

3. The method of claim 1, wherein the first number of repetitions corresponds to one repetition hypothesis level of a plurality of repetition hypothesis levels, each repetition hypothesis level being associated with a different channel quality between the UE and the base station.

4. The method of claim 1, further comprising
detecting one or more decoding failures of the at least one control channel communication during the first number of repetitions of the at least one control channel communication, wherein refraining from monitoring for the one or more additional repetitions is in response to detecting the one or more decoding failures.

5. The method of claim 1, further comprising:
refraining from monitoring for one or more repetitions of at least one data channel communication from the base station after detecting that the channel quality between the UE and the base station is below a threshold; and
entering the low power mode during the one or more repetitions of the at least one data channel communication.

6. The method of claim 5, wherein the data channel comprises at least one of a machine type communication physical downlink shared channel (MPDSCH) or a narrowband physical downlink shared channel (NPDSCH).

7. The method of claim 1, wherein the control channel comprises at least one of a machine type communication physical downlink control channel (MPDCCH) or a narrowband physical downlink control channel (NPDCCH).

8. The method of claim 1, wherein entering the low power mode is in response to determining that a number of the one or more additional repetitions of the at least one control channel communication is greater than a threshold.

9. An apparatus for wireless communication, comprising:
means for determining a first number of repetitions of at least one control channel communication from a base station to monitor based at least in part on a channel quality between the apparatus and the base station, wherein the first number of repetitions is less than a second number of repetitions of the at least one control channel communication configured for the apparatus;
means for monitoring for the first number of repetitions of the at least one control channel communication from the base station;
means for refraining from monitoring for one or more additional repetitions of the at least one control channel communication, after monitoring for the first number of repetitions of the at least one control channel communication; and
means for entering a low power mode during the one or more additional repetitions of the at least one control channel communication.

10. The apparatus of claim 9, wherein the first number of repetitions of the at least one control channel communication is an estimated number of repetitions for successfully decoding the at least one control channel communication based on the channel quality between the apparatus and the base station.

11. The apparatus of claim 9, wherein the first number of repetitions corresponds to one repetition hypothesis level of a plurality of repetition hypothesis levels, each repetition hypothesis level being associated with a different channel quality between the apparatus and the base station.

12. The apparatus of claim 9, further comprising
means for detecting one or more decoding failures of the at least one control channel communication during the first number of repetitions of the at least one control channel communication, wherein the means for refraining refrains from monitoring for the one or more additional repetitions in response to detecting the one or more decoding failures.

13. The apparatus of claim 9, further comprising:
means for refraining from monitoring for one or more repetitions of at least one data channel communication from the base station after detecting that the channel quality between the apparatus and the base station is below a threshold; and
means for entering the low power mode during the one or more repetitions of the at least one data channel communication.

14. The apparatus of claim 13, wherein the data channel comprises at least one of a machine type communication physical downlink shared channel (MPDSCH) or a narrowband physical downlink shared channel (NPDSCH).

15. The apparatus of claim 9, wherein the control channel comprises at least one of a machine type communication physical downlink control channel (MPDCCH) or a narrowband physical downlink control channel (NPDCCH).

16. The apparatus of claim 9, wherein the means for entering enters the low power mode in response to determining that a number of the one or more additional repetitions of the at least one control channel communication is greater than a threshold.

17. An apparatus for wireless communications, comprising:
at least one processor;
memory coupled to the at least one processor, the memory comprising instructions executable by the at least one processor to cause the apparatus to:
determine a first number of repetitions of at least one control channel communication from a base station to monitor based at least in part on a channel quality between the apparatus and the base station, wherein the first number of repetitions is less than a second number of repetitions of the at least one control channel communication configured for the apparatus;
monitor for the first number of repetitions of the at least one control channel communication from the base station;
after monitoring for the first number of repetitions of the at least one control channel communication, refrain from monitoring for one or more additional repetitions of the at least one control channel communication; and
enter a low power mode during the one or more additional repetitions of the at least one control channel communication.

18. The apparatus of claim 17, wherein the first number of repetitions of the at least one control channel communication is an estimated number of repetitions for successfully decoding the at least one control channel communication based on the channel quality between the apparatus and the base station.

19. The apparatus of claim 17, wherein the first number of repetitions corresponds to one repetition hypothesis level of a plurality of repetition hypothesis levels, each repetition hypothesis level being associated with a different channel quality between the apparatus and the base station.

20. The apparatus of claim 17, the memory further comprising instructions executable by the at least one processor to:
detect one or more decoding failures of the at least one control channel communication during the first number of repetitions of the at least one control channel communication; and refrain from monitoring for the one or more additional repetitions in response to detecting the one or more decoding failures.

21. The apparatus of claim 17, the memory further comprising instructions executable by the at least one processor to cause the apparatus to:
refrain from monitoring for one or more repetitions of at least one data channel communication from the base station after detecting that the channel quality between the apparatus and the base station is below a threshold; and
enter the low power mode during the one or more repetitions of the at least one data channel communication.

22. The apparatus of claim 21, wherein the data channel comprises at least one of a machine type communication physical downlink shared channel (MPDSCH) or a narrowband physical downlink shared channel (NPDSCH).

23. The apparatus of claim 17, wherein the control channel comprises at least one of a machine type communication physical downlink control channel (MPDCCH) or a narrowband physical downlink control channel (NPDCCH).

24. The apparatus of claim 17, the memory further comprising instructions executable by the at least one processor to: exit the low power mode in response to determining that a number of the one or more additional repetitions of the at least one control channel communication is greater than a threshold.

25. A non-transitory computer-readable medium having computer executable code stored thereon for performing a method for wireless communications by an apparatus, the method comprising:
determining a first number of repetitions of at least one control channel communication from a base station to monitor based at least in part on a channel quality between the apparatus and the base station, wherein the first number of repetitions is less than a second number of repetitions of the at least one control channel communication configured for the apparatus;
monitoring for the first number of repetitions of the at least one control channel communication from the base station;
after monitoring for the first number of repetitions of the at least one control channel communication, refraining from monitoring for one or more additional repetitions of the at least one control channel communication; and
entering a low power mode during the one or more additional repetitions of the at least one control channel communication.

26. The non-transitory computer-readable medium of claim 25, wherein the first number of repetitions of the at least one control channel communication is an estimated number of repetitions for successfully decoding the at least one control channel communication based on the channel quality between the apparatus and the base station.

27. The non-transitory computer-readable medium of claim 25, wherein the first number of repetitions corresponds to one repetition hypothesis level of a plurality of repetition hypothesis levels, each repetition hypothesis level being associated with a different channel quality between the apparatus and the base station.

28. The non-transitory computer-readable medium of claim 25, the method further comprising
detecting one or more decoding failures of the at least one control channel communication during the first number of repetitions of the at least one control channel communication, wherein refraining from monitoring for the one or more additional repetitions is in response to detecting the one or more decoding failures.

29. The non-transitory computer-readable medium of claim 25, the method further comprising:
refraining from monitoring for one or more repetitions of at least one data channel communication from the base station after detecting that the channel quality between the apparatus and the base station is below a threshold; and
entering the low power mode during the one or more repetitions of the at least one data channel communication.

30. The non-transitory computer-readable medium of claim 25, wherein entering the low power mode is in response to determining that a number of the one or more additional repetitions of the at least one control channel communication is greater than a threshold.

* * * * *